United States Patent
McCrobie

[11] 3,865,471
[45] Feb. 11, 1975

[54] LENS SYSTEM FOR PHOTOELECTROPHORETIC COPYING MACHINE

[75] Inventor: George L. McCrobie, Upland, Calif.

[73] Assignee: Xerox Corp., Stamford, Conn.

[22] Filed: Jan. 2, 1974

[21] Appl. No.: 430,269

[52] U.S. Cl. .............................. 350/215
[51] Int. Cl. .................. G02b 9/62, G02b 13/24
[58] Field of Search ....................... 350/215

[56] References Cited
UNITED STATES PATENTS
3,524,699  8/1970  Mori .................. 350/215

Primary Examiner—John K. Corbin
Attorney, Agent, or Firm—James J. Ralabate; David C. Petre; Charles E. Smith

[57] ABSTRACT

A symmetrical copying lens system having front and back compound lens components with a centrally located diaphragm therebetween adapted to an optical system of a photoelectrophoretic copy machine which can be used at 1:1 magnification. The front lens component has four lens elements including in the following order, a first lens element of positive power, a second lens element of positive power, a third lens element of positive power and a fourth lens element of negative power cemented to the third lens element adjacent to the diaphragm, and the back lens component having four similar lens elements positioned so that the lens system is symmetrical.

1 Claim, 1 Drawing Figure

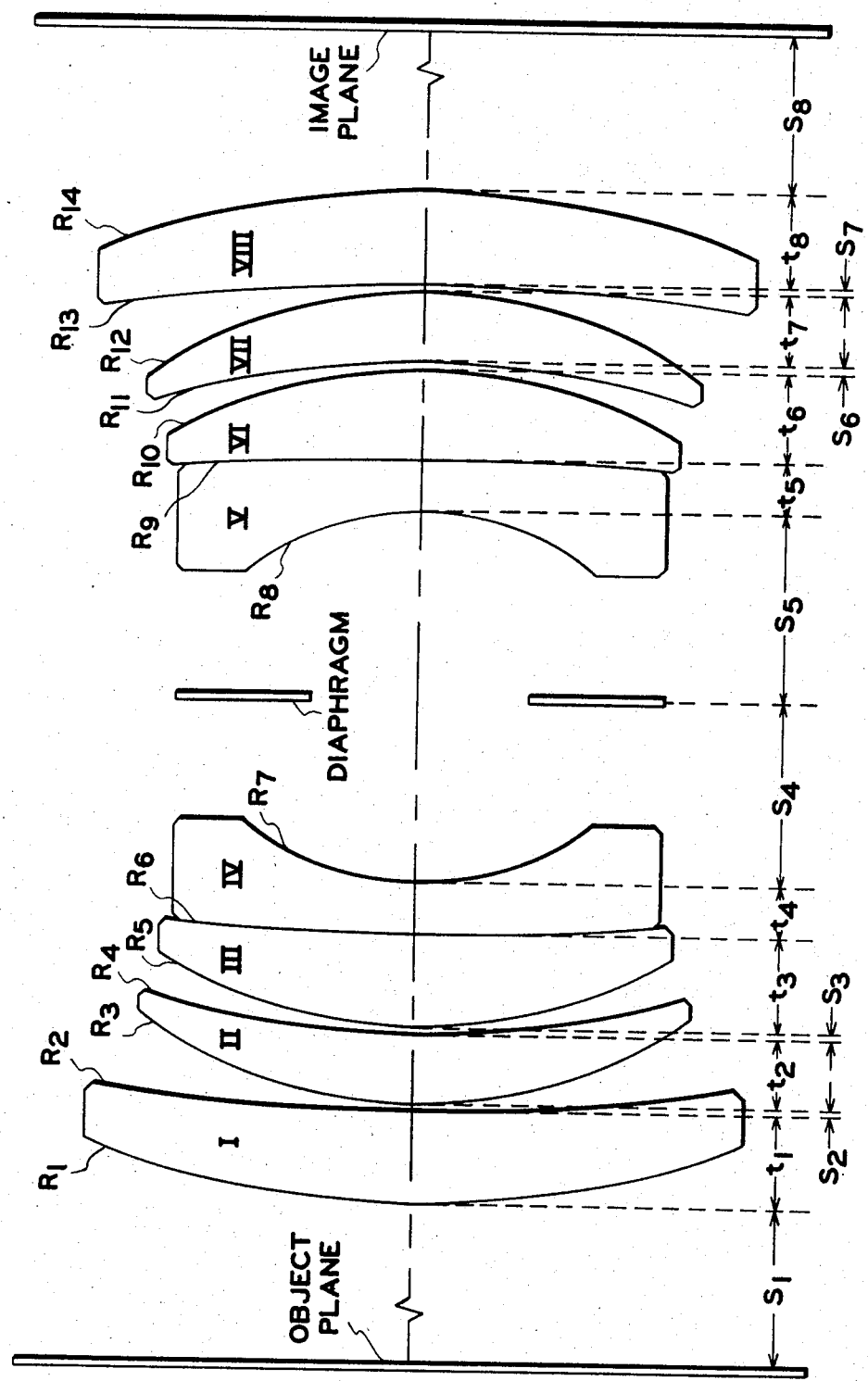

LENS SYSTEM FOR PHOTOELECTROPHORETIC COPYING MACHINE

BACKGROUND OF THE INVENTION

This invention relates to a lens system, and more particularly to a symmetrical lens system which is particularly suited to an optical system used in photoelectrophoretic copy machines.

In the photoelectrophoretic imaging process, wherein light patterns of black and white or full color original information are projected onto a photosensitive member to form a copy of the information on the member, a lens system is required which focuses the light pattern on the member to reproduce sharp, clear images. The characteristics of prior art lens systems for copiers such as the size of field angle that can be tolerated, degree of resolution and other rating factors are to a large extent dependent on the speed, or $f$-number of the lens system. As a general matter, it is known that as the $f$-number decreases, the overall performance of the copier lens system declines noticeably if the field angle remains constant. As a result, the lens system used in the present copiers generally maintain $f$-numbers in the range of $f$ (6.3) to $f$ (11.0) to assure good resolution at resonable field angles and over a wide spectral range to form images of adequate quality for the copier environment.

With the advent of more demanding copying systems, such as photoelectrophoretic systems, wherein wavelengths of light throught the visible spectrum pass through the lens systems, problems involving chromatic aberration called secondary color and oblique spherical aberration arise with prior art lens systems. For example, with regard to secondary color, in this situation, light rays of different wavelengths in the same ray bundle are displaced a small distance from one another upon reaching the image plane. This displacement causes an obvious depreciation in the image being formed, especially when reproducing color originals if the displacement is allowed to reach proportions discernable by the eye.

The copy lens system disclosed herein maintains high performance characteristics at all field positions throughout 5–10 lp/mm. The image field formed by the lens system has a large depth of focus which allows easy focusing.

SUMMARY OF THE INVENTION

Accordingly, it is an object of the present invention to improve the design of symmetrical type copy lens systems.

It is a further object of the present invention to improve lens systems employed in photoelectrophoretic copy machines.

It is a further object of the present invention to improve the quality of images performed by copy lens systems over a semi-field angle of approximately 12° and a speed of $f/3.2$.

It is a further object of the present invention to improve the quality of images formed using a light source which has a spectral range from 450 nm to 670 nm.

It is a further object of the present invention to improve the quality of images performed by a symmetrical lens system at 1:1 magnification.

These and other objects of the invention are accomplished by the use of a symmetrical copy lens system which comprises front and back lens components with a centrally located diaphragm therebetween adapted to an optical system of a photoelectrophoretic copy machine which can be used at 1:1 magnification. The lens system forms high quality images at all field positions throughout 5–10 lp/mm. The image field formed by the lens system is flat and the lens system has a large depth of focus which allows easy focusing.

The front lens component has four lens elements including, in the following order, a first convex-concave lens element of positive power; and a second convex-concave lens element of positive power; a third convex-concave lens element of positive power cemented to a fourth convex-concave lens element of negative power adjacent to the diaphragm, and the back lens component having four similar lens elements positioned so that the lens system is symmetrical.

BRIEF DESCRIPTION OF THE DRAWINGS

These and other objects and advantages will become apparent to those skilled in the art after reading the following description taken in conjunction with the accompanying drawing wherein:

THE FIGURE is a schematic illustration of the invention.

DESCRIPTION OF THE PREFERRED EMBODIMENTS

The lens system includes two compound lens components of four lens elements each having a diaphragm located therebetween. The eight lens elements are located so that the entire lens system is symmetrical about the diaphragm.

The front portion of the system includes lens element I which is a positive power lens, lens element II which is a positive power lens, lens element III which is a positive lens and lens element IV which is a negative power lens.

The lens elements in the back portion of the lens system which include lenses V, VI, VII, and VIII are of the same general configuration as lenses IV, III, II and I respectively, arranged in a complementary manner in the rear portion of the lens system in order to achieve a symmetrical lens system. The FIGURE shows the front portion of the lens system as including lens element I which is a convex-concave lens, lens element II which is shown as a convex-concave lens, lens element III which is shown as a convex-concave lens, and lens element IV which is shown as a convex-concave lens. The specific sizes, shapes and radii of the individual lens elements are only shown illustratively in the FIGURE and are not necessarily intended to be presented to scale. For instance, lens element I could be a double convex lens as long as its power remains positive. Similar changes can be made in the other lens elements of the system and the same is true of the back portion lens elements.

The parameters of the lens system are based on measurements taken on the system as shown in the FIGURE. The symbol S generally refers to the length of air spaces between elements in the system and the term T refers to the thickness of the lens elements, both distances being measured in inches along the center line of the lens system. Referring to the FIGURE, S1 is the distance between the object plane and lens element I, S2 is the distance between lens elements I and II, S3 is the distance between lens elements II and II, S4 is the distance between lens element IV and the diaphragm opening. S5 is the distance between the diaphragm opening and lens element V, S6 is the distance between lens elements VI and VII, S7 is the distance between lens elements VII and VIII. S8 is the distance between the image plane and lens element VIII and S8 equals S1.

T1 is the thickness of lens element I, T2 is the the thickness of lens element II, T3 is the thickness of lens element III, T4 is the thickness of lens element IV, T5 is the thickness of lens element V, T6 is the thickness of lens element VI, T7 is the thickness of lens element VII and T8 is the thickness of lens element VIII. In addition, lens element I has radii R1 and R2, lens element II has radii R3 and R4, lens element III has radii R5 and R6, lens element IV has radii R6 and R7, lens element V has radii R8 and R9, lens element VI has radii R9 and R10, lens element VII has radii R11 and R12, and lens element VIII has radii R13 and R14.

In the chart below, Radii (R), Thickness (T), Spacing (s) are expressed in inches and the negative sign indicates radii on centers of curvature lying on the object side of their vertices.

In many prior art copires, the correction of secondary color is particularly important. When the lens system disclosed herein is in this type of color copier at 1:1 magnification at a speed of $f/3.2$ secondary color effects are reduced. The reduction covers wavelengths in the range from 450 to 670 nm when the values shown in the Chart set forth hereinbelow are maintained.

The following chart is an example of cnstructional data for the preferred embodiment of this invention. In the chart, the radii of curvature R, the thickness $t$, the spacing $s$, the indices or refraction $Nd$ and the Abbe numbers $V_d$ are all expressed in the customary manner:

Although only certain preferred forms of the invention have been described in detail, other forms which are different in precise detail are possible.

What is claimed is:

1. A symmetrical type copying lens system having an aperture of substantially $f/3.2$ magnifying the object format by 1:1 magnification, said lens system being corrected for spherical abberation and chromatic abberation including secondary color, lateral and longitudinal chromatism, coma, astigmatism, distortion and field curvature, comprising:
   a. a front compound component including lens element I of positive power, lens element II of positive power, lens element III of positive power, and lens element IV of negative power between the object plane and diaphragm;
   b. a back compound component including lens elements V, VI, VII, and VIII the same general configuration as lenses IV, III, II and I respectively, arranged in a complementary manner in the rear portion of the lens system in order to achieve a symmetrical lens system;
   c. constructional data relating to said lens system having comprehensive values as given in the chart hereinbelow wherein $S_1$ designates the air space between the object plane and lens element I, $S_2$ designates the air space between lens elements I and II, $S_3$ designates the air space between lens elements II and III, $S_4$ designates the air space between lens element IV and the diaphragm opening, $S_5$ designates the air space between the diaphragm opening and lens element V, $S_6$ designates the air space between lens elements Vi and VII, $S_7$ designates the air space between lens elements VII and VIII, $S_8$ is

CHART

| LENS | RADII (R) | | THICKNESS ($t$) | SPACING ($s$) | | REFRACTIVE INDEX ($Nd$) | ABBE NO.($V_d$) |
|---|---|---|---|---|---|---|---|
| | | | | $S_1 =$ | 14.912 | | |
| I | $R_1$ | = 7.244 | $t_1 = 0.743$ | | | 1.691 | 54.7 |
| | $R_2$ | = 17.860 | | $S_2 =$ | 0.056 | | |
| II | $R_3$ | = 3.812 | $t_2 = 0.570$ | | | 1.564 | 60.8 |
| | $R_4$ | = 7.493 | | $S_3 =$ | 0.055 | | |
| III | $R_5$ | = 4.126 | $t_3 = 0.730$ | | | 1.699 | 49.7 |
| IV | $R_6$ | = 24.907 | $t_4 = 0.421$ | | | 1.640 | 34.6 |
| | $R_7$ | = 2.246 | | $S_4 =$ | 1.470 | | |
| | | | | $S_5 =$ | 1.470 | | |
| V | $R_8$ | = −2.246 | $t_5 = 0.421$ | | | 1.640 | 34.6 |
| VI | $R_9$ | = −24.907 | $t_6 = 0.730$ | | | 1.699 | 49.7 |
| | $R_{10}$ | = −4.126 | | $S_6 =$ | 0.055 | | |
| VII | $R_{11}$ | = −7.493 | $t_7 = 0.570$ | | | 1.564 | 60.8 |
| | $R_{12}$ | = −3.812 | | $S_7 =$ | 0.056 | | |
| VIII | $R_{13}$ | = −17.860 | $t_8 = 0.743$ | | | 1.691 | 54.7 |
| | $R_{14}$ | = −7.244 | | $S_8 =$ | 14.912 | | |

E.F.L. = 10.5" $f/3.2$ the air space between the image plane and lens element VIII, $T_1$ is the thickness of lens element I, $T_2$ is the thickness of lens element II, $T_3$ is the thickness of lens element III, $T_4$ is the thickness of lens element IV, $T_5$ is the thickness of lens element V, $T_6$ is the thickness of lens element VI, $T_7$ is the thickness of lens element VII, $T_8$ is the thickness of lens element VIII, lens element I of Radii $R_1$ and $R_2$, lens element II of Radii $R_3$ and $R_4$, lens element III of Radii $R_5$ and $R_6$, lens element IV of Radii $R_6$ and $R_7$, lens element V of Radii $R_8$ and $R_9$, lens element VI of Radii $R_9$ and $R_{10}$, lens element VII of Radii $R_{11}$ and $R_{12}$, lens element VIII of Radii $R_{13}$ and $R_{14}$:

E.F.L. = 10.5"  $f/3.2$

| LENS | RADII (R) | | THICKNESS (t) | SPACING (s) | | REFRACTIVE INDEX (Nd) | ABBE NO. ($V_d$) |
|---|---|---|---|---|---|---|---|
| | | | | $S_1 =$ | 14.912 | | |
| I | $R_1$ | = 7.244 | $t_1 = 0.743$ | | | 1.691 | 54.7 |
| | $R_2$ | = 17.860 | | | | | |
| | | | | $S_2 =$ | 0.056 | | |
| II | $R_3$ | = 3.812 | $t_2 = 0.570$ | | | 1.564 | 60.8 |
| | $R_4$ | = 7.493 | | | | | |
| | | | | $S_3 =$ | 0.055 | | |
| III | $R_5$ | = 4.126 | $t_3 = 0.730$ | | | 1.699 | 49.7 |
| | $R_6$ | = 24.907 | | | | | |
| IV | $R_7$ | = 2.246 | $t_4 = 0.421$ | | | 1.640 | 34.6 |
| | | | | $S_4 =$ | 1.470 | | |
| | | | | $S_5 =$ | 1.470 | | |
| V | $R_8$ | = −2.246 | $t_5 = 0.421$ | | | 1.640 | 34.6 |
| | $R_9$ | = −24.907 | | | | | |
| VI | $R_{10}$ | = −4.126 | $t_6 = 0.730$ | | | 1.699 | 49.7 |
| | | = −7.493 | | $S_6 =$ | 0.055 | | |
| VII | $R_{11}$ | | $t_7 = 0.570$ | | | 1.564 | 60.8 |
| | $R_{12}$ | = −3.812 | | | | | |
| | | | | $S_7 =$ | 0.056 | | |
| VIII | $R_{13}$ | = −17.860 | $t_8 = 0.743$ | | | | |
| | $R_{14}$ | = −7.244 | | | | | |
| | | | | $S_8 =$ | 14.912 | | |

\* \* \* \* \*

UNITED STATES PATENT OFFICE
CERTIFICATE OF CORRECTION

Patent No. 3,865,471               Dated February 11, 1975

Inventor(s)    George L. McCrobie

It is certified that error appears in the above-identified patent and that said Letters Patent are hereby corrected as shown below:

Column 4, line 34, delete "Vi" and insert --VI--.

Column 6, for LENS VIII, under Refractive Index (Nd) which is blank, insert --1.691--.

Column 6, for LENS VIII, under Abbe No. (Vd) which is blank, insert --54.7--.

Signed and sealed this 15th day of April 1975.

(SEAL)
Attest:

RUTH C. MASON
Attesting Officer

C. MARSHALL DANN
Commissioner of Patents
and Trademarks